United States Patent [19]
Soumar et al.

[11] Patent Number: 5,934,850
[45] Date of Patent: Aug. 10, 1999

[54] LOAD SECURING DEVICE

[76] Inventors: Radovan Soumar, 15 Middle Oxbox Rd.; William F. Solomon, 2 Streeter La., both of Hinsdale, N.H. 03451

[21] Appl. No.: 09/156,368

[22] Filed: Sep. 17, 1998

[51] Int. Cl.⁶ ........................................... B60P 7/15
[52] U.S. Cl. .......................... 410/155; 410/143; 410/122; 410/151
[58] Field of Search ..................... 410/143, 145, 410/121, 122, 151, 155, 94; 248/354.1; 211/105.3; 224/551, 552

[56] References Cited

U.S. PATENT DOCUMENTS

| | | |
|---|---|---|
| 538,500 | 4/1895 | Bulkley . |
| 2,473,947 | 6/1949 | Hamstrom ..................... 248/354.1 X |
| 2,654,932 | 10/1953 | Goudie . |
| 2,764,105 | 9/1956 | Stiegel . |
| 2,973,934 | 3/1961 | Foster . |
| 3,200,772 | 8/1965 | Moorhead . |
| 3,295,697 | 1/1967 | Patterson . |
| 3,930,645 | 1/1976 | Anderson ..................... 248/354.1 X |
| 4,042,264 | 8/1977 | Shumer . |
| 4,343,578 | 8/1982 | Barnes ................................ 410/151 |
| 4,492,499 | 1/1985 | Gasper ................................. 410/32 |
| 4,502,619 | 3/1985 | Cox . |
| 4,650,383 | 3/1987 | Hoff ..................................... 410/149 |
| 4,737,056 | 4/1988 | Hunt ..................................... 410/151 |
| 4,770,579 | 9/1988 | Aksamit ............................... 410/150 |
| 4,772,165 | 9/1988 | Bartkus ............................ 410/145 X |
| 5,082,404 | 1/1992 | Stewart et al. ..................... 410/127 |
| 5,161,762 | 11/1992 | Stewart et al. . |
| 5,427,487 | 6/1995 | Brosfske .............................. 410/121 |
| 5,433,566 | 7/1995 | Bradley ............................... 410/121 |

FOREIGN PATENT DOCUMENTS

| | | | |
|---|---|---|---|
| 535426A1 | 4/1993 | European Pat. Off. ............... | 224/552 |
| 1289713 | 11/1985 | U.S.S.R. . | |

*Primary Examiner*—Stephen T. Gordon
*Attorney, Agent, or Firm*—Bourque and Associates, P.A.

[57] ABSTRACT

A load securing device is used with a support bar to secure a load, for example, in a truck trailer. The load securing device includes a load abutting member that abuts against a side of the load. A mounting member is coupled to the load abutting member for removably and adjustably mounting to the support bar. The mounting member includes an open region for receiving the support bar and having a notch on a bottom portion thereof for engaging the support bar. A spring member is coupled to the mounting member proximate the open region and is biased against the support rod when the support rod is received in the open region. The spring member includes a support bar receiving region for receiving the support bar opposite the notch in the bottom portion of the open region. The load abutting member is preferably angled with respect to the mounting member such that the spring member and the mounting member provide a self-locking mechanism. The self-locking mechanism allows the load securing device to be easily installed, adjusted and removed while securely preventing a load from shifting.

20 Claims, 3 Drawing Sheets

LOAD SECURING DEVICE

FIELD OF THE INVENTION

The present invention relates to load securing devices and in particular, to truck load securing devices that are removably and adjustably installed to secure a load in a truck trailer.

BACKGROUND OF THE INVENTION

When trucks are used to transport cargo, damage to the cargo often occurs as a result of the cargo load shifting in the truck trailer. A load of cargo, such as produce, is typically stacked in the trailer on pallets. The stacks of cargo may be stable if the entire trailer is full. However, if the trailer is only partially full, the stacked loads become unstable and will tip side-to-side. These loads can be re-arranged for stability in order to prevent damage to the cargo. However, truck drivers often fail to take the time to properly arrange the truck loads, especially when they are under time pressure to make their deliveries.

One way of supporting the cargo is to use conventional support bars extending from the bottom to the top of the trailer and positioned against the stacked cargo. If the top or bottom of the truck becomes warped or deformed, however, these support bars will loosen and fall out. Also, changes in air temperature often cause the support bars to become loose. For example, if support bars are installed in a geographic region having hot temperatures, the bars will contract as the truck travels to a geographic location having colder temperatures, thereby causing the bars to fall out.

The conventional devices used to secure loads in tractor trailers are also difficult to install, adjust and remove. As a result, truck drivers often will not properly install or adjust the securing devices, resulting in unstable loads and damaged cargo. The conventional load securing devices are also unable to effectively secure different types and sizes of loads in various locations of the truck trailer.

Accordingly, a need exists for a load securing device that effectively secures a load, such as a load of cargo in a truck trailer, without becoming unsteady. A need also exists for a truck load securing device that is easily installed, adjusted and removed to secure loads of various sizes and shapes in various locations of the truck.

SUMMARY OF THE INVENTION

The present invention features a load securing device for use with a support bar in supporting a load, for example, in a truck trailer. The load securing device comprises a load abutting member for abutting against a side of the load. A mounting member is coupled to the load abutting member for removably and adjustably mounting to the support bar. The mounting member includes an open region or slot for receiving the support bar. The open region or slot extend through the mounting member and is open to one side of the mounting member to receive the support bar. A biasing member is coupled to the mounting member proximate to the open region and is biased against the support rod when the support rod is received in the open region of the mounting member.

In the preferred embodiment, the mounting member and the load abutting member are coupled such that the load abutting member is angled with respect to the mounting member. In the exemplary embodiment, the mounting member includes a mounting portion and a load abutting member coupling portion that forms an angle with respect to the mounting portion. In one example, the angle is about 20°. The load abutting member is coupled to the load abutting member coupling portion, and in one example, the load abutting member is formed from a pipe bent into a generally rectangular shape.

According to the preferred embodiment, the open region is generally U-shaped, and a bottom portion of the open region includes a notch for stabilizing the support bar received in the open region. The biasing member preferably includes a leaf spring coupled to the mounting member and at least partially covering the open region in the mounting member. The leaf spring preferably includes a support bar receiving region for receiving a portion of the top surface of the support bar. When installed, the notch in the bottom portion of the open region and the support bar receiving region in the leaf spring contact the support bar with the mounting member at an angle, such that the load securing device self-locks in position on the support bar against the load.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
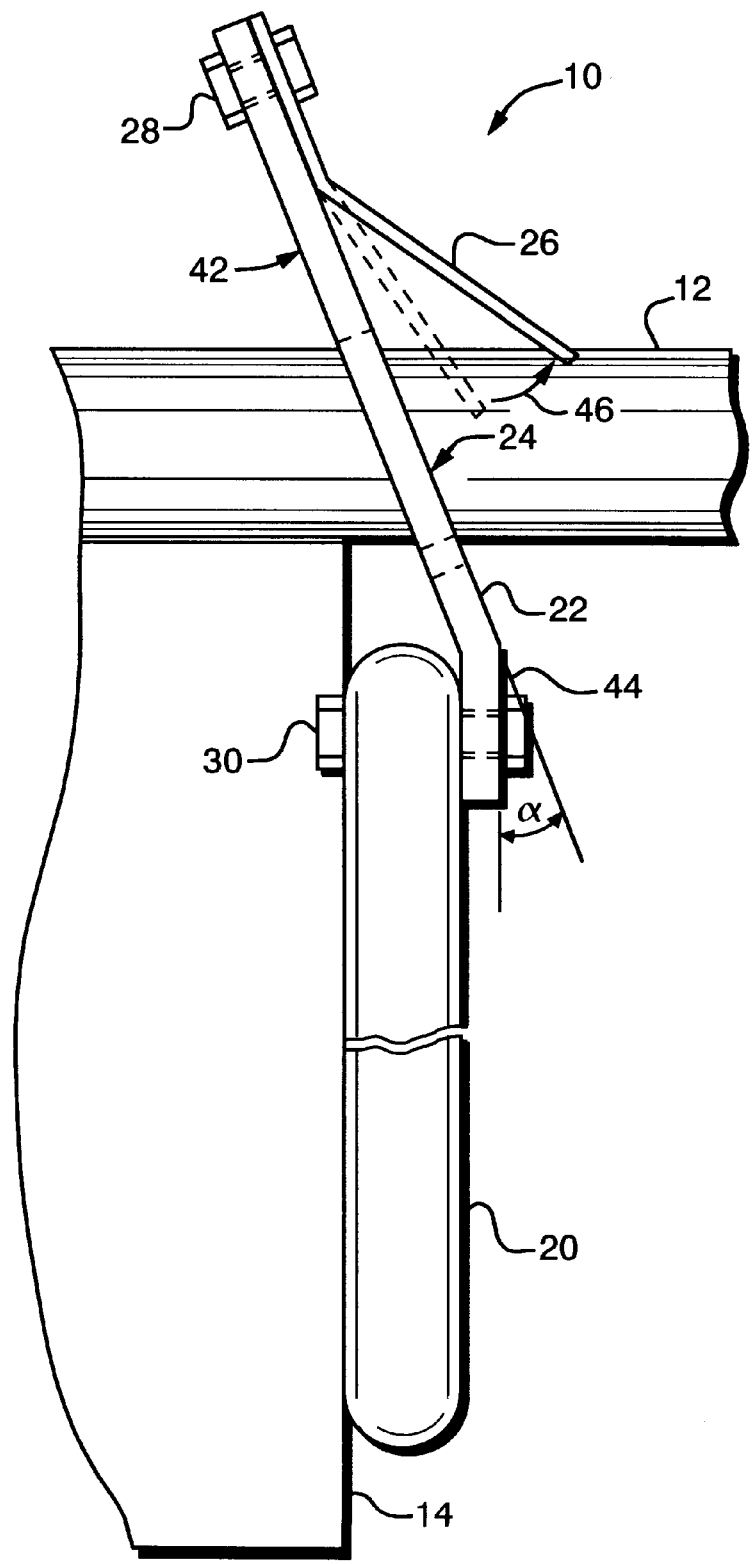
FIG. 1 is a side view of a load securing device installed on a support bar and secured against a load, according to the present invention.

The load securing device 10, FIG. 1, according to the present invention, is used with a support bar 12 to secure a load 14. The support bar 12 extends generally horizontally and generally above the load 14. One use for the load securing device 10 is to secure cargo loads in a truck trailer, as described in greater detail below. The load securing device 10 of the present invention can also be used in other types of vehicles, such as railroad cars, cargo planes, cargo ships, and the like, and in other types of storage regions, such as warehouses.

The load securing device 10 includes a load abutting member 20 for abutting against a side of the load 14. A mounting member 22 is coupled to the load abutting member 20 and includes an open region or slot 24 that receives the support bar 12 to adjustably and removably mount the load securing device 10 on the support bar 12. A biasing or spring member 26, such as a leaf spring, is coupled to the mounting member 22 and is biased against the support rod 12 to self-lock the load securing device 10 on the support rod 12.

In the exemplary embodiment, the spring member 26 is coupled to the mounting member 22 using one or more fasteners 28 such as nut and bolt fasteners. The biasing or spring member 26 is preferably made of a resilient material, such as spring steel. The mounting member 22 is preferably made of a rigid material, such as cold or hot rolled steel. The present invention contemplates other types of material and configurations for the mounting member 22 and spring member 26 as well as other ways of fastening the spring member 26 to the mounting member 22.

Figure 2:
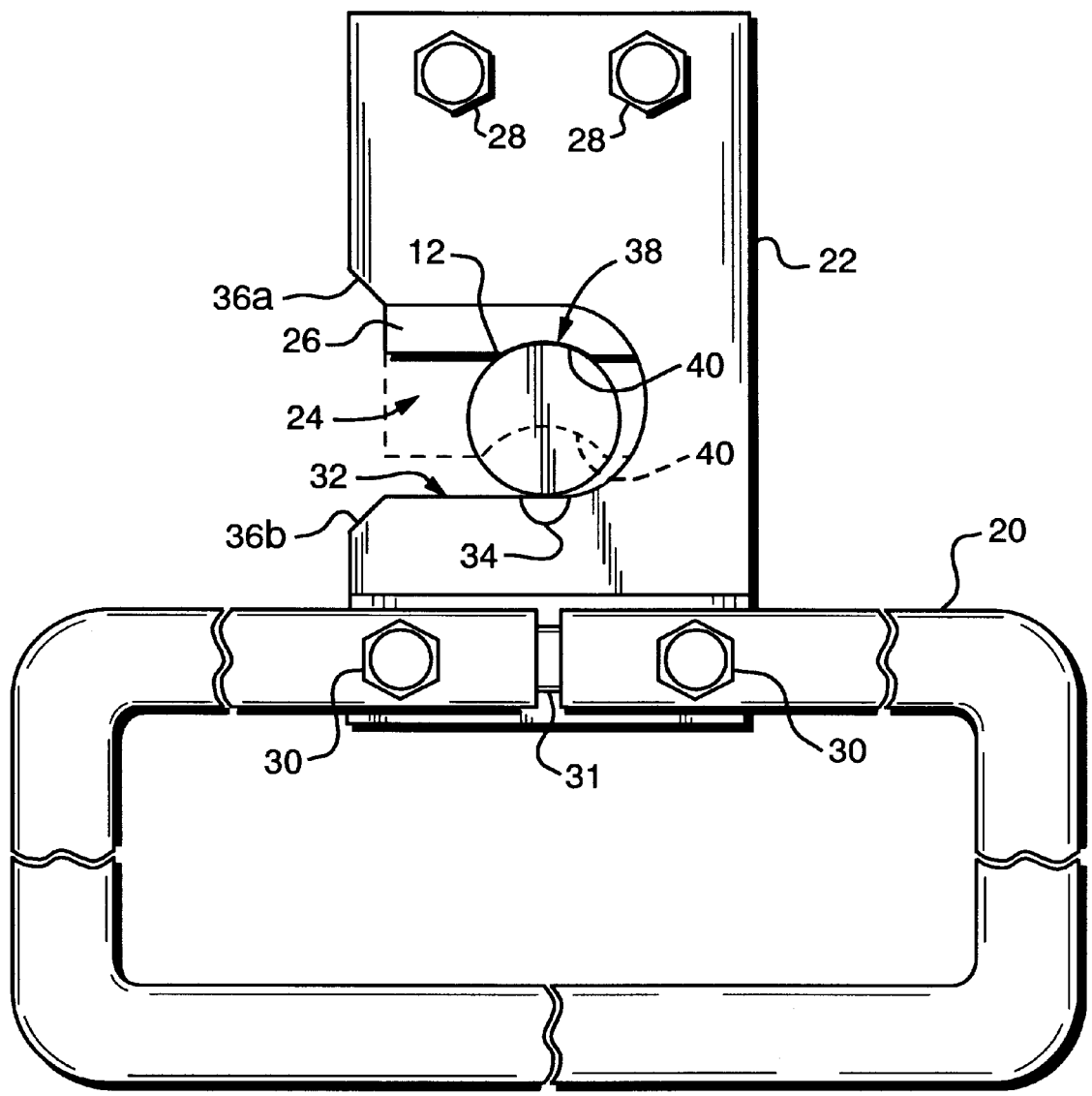
FIG. 2 is a front view of the load securing device, according to the present invention.

In the exemplary embodiment, the load abutting member 20, FIG. 2, has a generally rectangular shape. The load abutting member 20 can be formed from a pipe (e.g., ½ in. electrical metallic tubing) and bent into the generally rectangular shape. The present invention also contemplates having the load abutting member 20 made of aluminum tubing or square tubing, or other similar materials. A reinforcement member or bar 31 preferably extends into the open ends of the pipe used to form the load abutting member 20 to reinforce the pipe or tubing. In one example, the reinforcement member 31 is made of aluminum flat stock having a cross-section of about ⅜×¼ in. and a length of about 2⅞ in. According to the exemplary embodiment, the load abutting member 20 is coupled to the mounting member 22 using one or more fasteners 30, such as nut and bolt fasteners, which preferably extend through the reinforcement member 31. The present invention contemplates other materials and configurations for the load abutting member 20 as well as other ways of fastening the load abutting member 20 to the mounting member 22.

The open region 24 in the mounting member 22 preferably has a U-shape for receiving the support bar 12. A bottom portion 32 of the open region 24 preferably includes a notch 34 for stabilizing the support bar 12 in the open region 24 and for stabilizing the support bar 12. The preferred embodiment of the mounting member 22 also preferably includes angled surfaces 36a, 36b proximate the open region 24 to facilitate positioning the support bar 12 within the open region 26.

The spring member 26 at least partially covers the open region 24 and contacts a top region 38 of the support bar 12 extending through the open region 24. The spring member 26 preferably includes a support bar receiving region 40 preferably having a generally arcuate shape for contacting the top region 38 of the support bar 12 received in the open region 24. The open region 24 allows the mounting member 22 to be easily installed and removed. The notch 34 and the spring member 26 having the support bar receiving region 40 secure the support bar 12 within the open region 24 to facilitate the self-locking.

The mounting member 22 and the load abutting member 20 are preferably coupled such that the load abutting member 20 is angled with respect to the mounting member 22 (see FIG. 1). In the exemplary embodiment, the mounting member 22 includes a mounting portion 42 and a load abutting member coupling portion 44 that forms an angle α with respect to the mounting portion 42. When the load securing device 10 is installed on a support bar 12 and against a load 14, the load abutting member 20 preferably lies generally flat against a side of the load 14, and the mounting member 22 is angled to facilitate the self-locking of the spring member 26 against the support member 12. In one preferred embodiment, the angle a is about 20°.

To install the load securing device 10, the spring member 26 is moved from a retracted or unbiased position (shown in phantom) generally in the direction of arrow 46 (See FIG. 1) while the support bar 12 is positioned within the open region 24 (See FIG. 2). The support bar 12 is preferably positioned between the notch 34 and the support bar receiving region 40 in the spring member 26. The mounting member 22 can then slide along the support bar 12 until the load abutting member 20 is secured in the desired position against the load 14. By lifting the spring member 26, the load securing device 10 can be easily removed or moved to other positions on the support bar 12.

Figure 3:
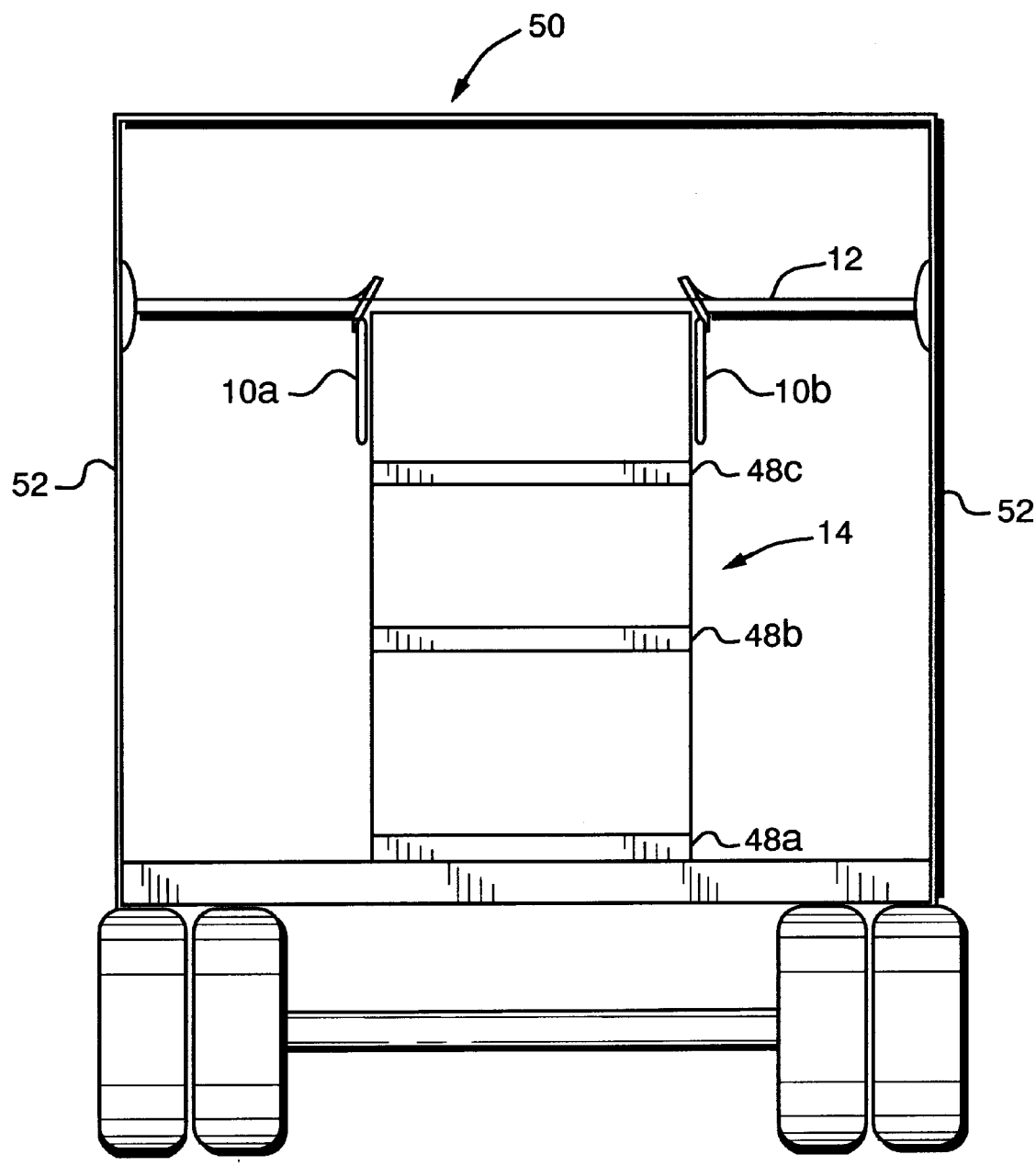
FIG. 3 is a rear view of a truck trailer containing a load secured by load securing devices, according to the present invention.

According to the exemplary use, one or more load securing devices 10a, 10b, FIG. 3, are used to secure a load 14, such as a stack of pallets 48a–48b, in a truck trailer 50. One or more support bars 12 are engaged with the sides 52 of the truck trailer 50 and are positioned generally above or against a top region of the load 14. The load securing devices 10a, 10b are installed on the one or more support bars 12, as discussed above, on each side of the load 14. When moved to the proper position against the load 14, the load securing devices 10a, 10b self lock on the support bar 12, thereby preventing the load 14 from tipping while in the truck trailer 50.

Although the exemplary embodiment shows the load 14 generally in a central region of the truck trailer 50, the load 14 could be positioned at various locations within the truck. The load securing devices 10a, 10b can easily be installed on and removed from the support bar(s) 12 as well as adjusted to any position on the support bar(s) 12. Even if the support bar(s) 12 becomes loose, the self-locking feature of the load securing devices 10a, 10b allows the load securing devices 10a, 10b to be locked against the load 14 and maintain the load 14 in a stable position.

Accordingly, the load securing device of the present invention allows a load to be secured, for example, in a truck trailer, to prevent shifting of the load and damage to the cargo even if the support bars become loose. The load securing device has a self-locking mechanism and is easily installed, adjusted, and removed, to allow various sizes and shapes of loads to be secured in various different locations.

Modifications and substitutions by one of ordinary skill in the art are considered to be within the scope of the present invention which is not to be limited except by the claims which follow.

What is claimed is:

1. A load securing device for use with a support bar in securing a load, said load securing device comprising:

a load abutting member for abutting against a side of said load;

a mounting member coupled to said load abutting member for removably and adjustably mounting to said support bar, said mounting member including an open slot extending through said mounting member and being open to one side of said mounting member for receiving said support bar; and a biasing member coupled at a first end to said mounting member proximate said open slot, wherein a second end of said biasing member is biased against said support bar when said support bar is received in said open slot.

2. The load securing device of claim 1 wherein said mounting member and said load abutting member are coupled such that said load abutting member is angled with respect to at least a portion of said mounting member.

3. The load securing device of claim 2 wherein said mounting member includes a mounting portion and a load abutting member coupling portion, wherein said load abutting member coupling portion forms an angle with respect to said mounting portion.

4. The load securing device of claim 3 wherein said angle between said load abutting member coupling portion and said mounting portion is about 20°.

5. The load securing device of claim 1 wherein said open slot is generally U-shaped.

6. The load securing device of claim 1 wherein a bottom portion of said open slot includes a notch for stabilizing said support bar received in said open slot.

7. The load securing device of claim 1 wherein said biasing member includes a leaf spring coupled to said mounting member, wherein said leaf spring at least partially covers said open slot in said mounting member.

8. The load securing device of claim 7 wherein said leaf spring includes a support bar receiving region at one end thereof for receiving and securing said support bar.

9. The load securing device of claim 1 wherein said load abutting member is generally rectangular shaped.

10. The load securing device of claim 1 wherein said load abutting member is formed from a pipe.

11. The load securing device of claim 10 wherein said pipe is bent into a generally rectangular shape.

12. A truck load securing device for use with a support bar in securing a load in a truck trailer, said truck load securing device comprising:

a load abutting member for abutting against a side of said load;

a mounting member coupled to said load abutting member for removably and adjustably mounting to said support bar, said mounting member including an open slot extending through said mounting member and open to one side of said mounting member for receiving said support bar, said open slot having a notch on a bottom portion thereof for stabilizing said support bar, and wherein said load abutting member is angled with respect to at least a portion of said mounting member; and a spring member coupled to said mounting member proximate said open slot, wherein said spring member is biased against said support bar when said support bar is received in said open slot, and wherein said spring member includes a support bar receiving region at one end thereof for receiving said support bar opposite said notch in said bottom portion of said open slot such that sa d spring member and said mounting member provide self-locking.

13. The truck load securing device of claim 12 wherein said mounting member includes a mounting portion and a load abutting member coupling portion, and wherein said load abutting member coupling portion forms an angle with respect to said mounting portion.

14. The truck load securing device of claim 13 wherein said angle between said load abutting member coupling portion and said mounting portion is about 20°.

15. The truck load securing device of claim 12 wherein said open slot is generally U-shaped.

16. The truck load securing device of claim 12 wherein said load abutting member is generally rectangular shaped.

17. A load securing device for use with a support bar in securing a load, said load securing device comprising:

a load abutting member for abutting against a side of said load, said load abutting member formed from a pipe bent into a generally rectangular shape;

a mounting member coupled to said load abutting member for removably and adjustably mounting to said support bar, said mounting member including an open region for receiving said support bar; and a biasing member coupled to said mounting member proximate said open region, wherein said biasing member is biased against said support bar when said support bar is received in said open region.

18. The load securing device of claim 17 wherein said mounting member and said load abutting member are coupled such that said load abutting member is angled with respect to at least a portion of said mounting member.

19. The load securing device of claim 17 wherein a bottom portion of said open region includes a notch for stabilizing said support bar received in said open region.

20. The load securing device of claim 17 wherein said biasing member includes a leaf spring coupled at a first end to said mounting member, wherein said leaf spring at least partially covers said open region in said mounting member, and wherein said leaf spring includes a support bar receiving region at a second end thereof for receiving and securing said support bar.

\* \* \* \* \*